March 11, 1924.                                                                    1,486,378
H. HIRSCH
DEVICE FOR KEEPING ACCOUNT OF INDUSTRIAL LIFE INSURANCE PREMIUM
COLLECTIONS AND THE LIKE
Filed March 16, 1921                    2 Sheets-Sheet 1

Fig. 1

Harry Hirsch.   INVENTOR

BY Morris Hirsch
      his ATTORNEYS.

March 11, 1924.

H. HIRSCH 1,486,378

DEVICE FOR KEEPING ACCOUNT OF INDUSTRIAL LIFE INSURANCE PREMIUM
COLLECTIONS AND THE LIKE

Filed March 16, 1921

2 Sheets-Sheet 2

Fig. 2.

Harry Hirsch Inventor

By his Attorney

Morris Hirsch.

Patented Mar. 11, 1924.

1,486,378

UNITED STATES PATENT OFFICE.

HARRY HIRSCH, OF NEW YORK, N. Y.

DEVICE FOR KEEPING ACCOUNT OF INDUSTRIAL LIFE-INSURANCE PREMIUM COLLECTIONS AND THE LIKE.

Application filed March 16, 1921. Serial No. 452,656.

*To all whom it may concern:*

Be it known that I, HARRY HIRSCH, a citizen of the United States, and resident of New York city, in the county of New York and State of New York, have invented certain new and useful Improvements in Devices for Keeping Account of Industrial Life-Insurance Premium Collections and the like, of which the following is a specification.

My present invention relates in general to accounting systems and more particularly to devices for controlling great numbers of small periodical payments, the preferred application being to the business of industrial life insurance.

It may be noted that in view of the vast number of small collections made by the numerous agents in the employ of an industrial life insurance company, the compilation of collectors' reports and the preparation of elaborate office accounts from such collectors' reports would ordinarily involve considerable expense for stationary, office space and equipment and clerical help, while in the absence of some satisfactory checking system, the frequent discrepancies resulting from ignorance of accounting, carelessness, and fraud on the part of collectors would be a source of annoyance and of considerable financial loss to the company.

It is an object of my invention to devise a system applicable to industrial life insurance accounts, which shall be easy to install at small expense, the use of which shall require no special knowledge or skill on the part of the collector, which shall substantially eliminate the possibility of error and fraud, and which shall lend itself readily to the preparation of office records. In the execution of my system I employ a device, which shall inherently provide effective safeguards against error and fraud, thus effecting economy in the number of clerical employees required; which shall avoid the use of varied numbers of printed forms and ledgers, thus effecting economy in stationery and printing, and which shall be readily adaptable for the preparation of accurate office records apart from those used by the agent, and this with the use of a minimum of filing appurtenances.

It may here be noted that the successive installments of life insurance premiums are generally collected periodically and in cash by agents of the company. The housewife on each collection day as a rule pays one or more of the installments on each of the industrial policies carried by the various members of the household. It is, accordingly, the practice for insurance companies to classify all of the policies in any family or household on which collection payments are made as a single group, each group being identified by a number.

According to a preferred feature of the invention, the agent or collector is provided with a number of units, preferably in the form of cards, one for each family or household group, a duplicate of such unit being in the possession of the person who makes the group premium payment. The unit is characterized by the fact that it includes a set of detachable coupons, one corresponding to each day on which a collection is due and having such date imprinted thereon, each said coupon, moreover, having blanks for entry of the amount and date of the last payment prior to the date printed thereon. In practical use, the collector who receives a payment severs from the corresponding group card in his possession as well as from the duplicate in the custody of the policyholders, the coupon or coupons corresponding to the installment or installments paid, preferably discarding such coupons, and entering the data as to said payment in the blanks on the first of the remaining coupons, that is, on the coupon indicating the date on which the next installment of premium for the group of policies is due. Thus the amount and date of last payment, and the date that the next payment is due can be determined at a glance by inspection of the first of the coupons remaining on the card, and all danger of confusion is avoided since all obsolete data have been previously removed from the card in the use of the system. The full details of the installation and operation of the system will be explained hereinafter.

In the accompanying drawings in which is shown one of various possible embodiments of the several features of the invention, Figure 1 shows a preferred form of unit or blank card employed in the execution of my system, and;

Figure 2 indicates the manner of use of the device shown in Fig. 1.

Referring to the drawings, I have shown a rectangular card having ruled lines thereon, to form, in the particular embodiment shown, seven tabular spaces or columns, respectively entitled, Policy No., Name of insured, Premium, Amount, Kind of insurance, Age, and File No., each column being of appropriate width for the entry of the corresponding items as shown in Fig. 2. The total of the premium may be indicated at the bottom of the premium column, as shown. At the upper right hand corner of the card is the mark, Group No., for entry as shown in Fig. 2 of the number which identifies the family or household group. In the particular embodiment shown, space is provided for ten policies, which is sufficient for all but a very small percentage of families. Of course, the policy table described may be provided with room for a greater or lesser number of policies, and a greater or lesser number of columns may be used for more or less data than here shown, but the specific arrangement shown is preferred. Blank spaces for the address or residence, apartment or floor number of the group is preferably provided at the upper end of the card as shown, and at the extreme left, the year is printed. Below the policy table is provided a table for further data, preferably in the form shown for indication of the name and address of the district or branch office, the number and name of the agent or collector, the debit number, etc. In the preferred form the lower portion of the card is subdivided into fifty-six rectangles, arranged in the specific embodiment shown, in eight horizontal rows of seven each, and marked successively 1 to 56 as shown. The border lines of these rectangles are sharply imprinted, so that the paper will naturally sever along these lines rather than through the area of the rectangles, upon application of sufficient disruptive force. The corresponding rectangles thus constitute tabs or coupons which can be readily detached from the remainder of the card, singly or in groups of more than one, and which will not become severed unintentionally. The individual detachable coupons as shown each bear imprinted thereon an identifying date, the successive dates being one week apart as shown. Each coupon, moreover, bears blank spaces for entries preferably of the amount collected at the last prior collection, of the number of weekly installments covered by said last prior collection, of the date thereof, and of the name or initial of the agent or collector. The letters L. P. immediately below the printed date on each coupon are an abbreviation, representing last payment and indicating that the entries apply to the date and amount of the last prior payment, rather than the payments on the printed date. The rectangles numbered 53, 54, 55 and 56 provide for the first payments of the following year, which, in some cases, may be made before the card for the new or succeeding year has been issued.

In carrying out my system, each household in which collections are to be made would be provided with a card of the type shown, which I will call the policy-holder's card, the entries of the policy numbers, name of insured, premius, ages, amounts, etc., being previously made upon the card at the branch office or by the collector prior to placing the card in the possession of the policy-holder group. Preferably a special envelope would be provided for the card, to be attached by the policy-holders to the wall so that the card can readily be found when collections are to be made.

The agent or collector is provided with duplicates of the cards referred to, which I will call collector's cards, and he will thus have in his possession one card for each group or household on his debit. If desired, the collector's cards may be bound in a loose-leaf cover. Preferably also a third group of such cards, which I will call office cards, would be in the possession of the branch office preserved in card filing cabinets, and if desired, a fourth such group may be in the possession of the home office. It will be understood that the policy-holder's cards, the collector's cards, the branch office and the home office cards may be, and preferably are, identical forms, each of these sets, however, being preferably printed on sheets of distinctive colors, to avoid confusion.

The operation of the system will now be set forth. Referring to Fig. 2, assume that in the case of the particular family-group there shown, a collection is made on Nov. 24 for three weeks and that the first tab or coupon that the collector finds on the card is No. 45 dated Nov. 7. The collector will sever the first three tabs or coupons 45, 46 and 47 bearing respectively the dates Nov. 7, Nov. 14 and Nov. 21 from the policy-holder's card as well as from his own, preferably using an angle-piece for the purpose and will fill out the blanks on the first of the remaining coupons, that is, on coupon No. 48 which bears the date of Nov. 28. Specifically, he will enter in this case upon coupon No. 48, preferably in ink or in indelible pencil, at the spaces provided, the amount he has collected, $1.59 on the first line, the numeral three on the second line, indicating the number of weeks paid for, the date of collection, in this case Nov. 24 on the third line, and his initials or name as collector on the fourth line. The same entries are then and there made upon the duplicate card in the collector's possession. All of the three coupons severed as shown in Fig. 2 are preferably discarded or destroyed, although the policy-holder may preserve them, if he chooses. The agent's and the policy-holder's cards, as shown in Fig. 2, will now reveal at a glance, that the next payment is due Nov. 28, all payments prior to that date having been made, and that the last prior collection was on Nov. 24, on which day $1.59, covering three weeks was collected by agent H. H. The entries on coupon No. 45 shows the date and amount of collection last prior to that on Nov. 24. The information on coupon No. 45 having become obsolete as the payment of Nov. 24 was made, the preservation of said coupon is of no particular use and for reasons which will appear more fully below it is advantageous to discard it.

Thus, at all times there is but a single coupon on the card that bears written entries, in particular, indicating the amount and date of last payment and this coupon has, moreover, printed thereon the date when the next premium payment is due.

It will be understood that the entries could be made upon the coupon, which represents the last week actually covered by the last payment, in which case the succeeding or first blank coupon would represent the date that the next premium is due. I prefer, however, the specific arrangement shown and described.

At any time the agent or collector can readily check up the amount of money collected on any day by simply adding the entries of amounts on the first coupon of each group card. There is no possibility of confusion in reading a wrong entry, since, as previously noted, only the first coupon remaining on the card bears any entry.

At the end of any day, the agent will find that the various group cards in his possession will bear varying numbers of coupons, some family-groups having paid for one or more weeks in advance and consequently having less coupons remaining than others, who are either exactly up to date or in arrears. Obviously, by a simple process of superposition of cards, the agent can readily separate them into groups, the cards in each group having the same number of coupons or being of the same size and shape.

By disregarding that group of cards which in practice will usually comprise the majority of families who have paid their premiums exactly up to date, and are neither in advance nor arrear, the agent or a clerk of the company can by simple and obvious additions find the total amount of advance payments in the small set of groups paid in advance and the total amount of arrears in the small set of groups in arrears and by subtraction of the total arrears from the total advance payments, or vice versa, can immediately determine the state of the debit, that is, to what extent the debit as a whole is in advance or arrears, informaion which is of vital interest to the office manager in determining the state of the accounts and the proficiency of his collectors.

Preferably, the collector will be required at the end of each day to turn in to the branch office all of the cards on which collections were made during that day and at the end of the week to turn in all of the remaining cards. At the branch office, the total collections for the week will be readily determined by the addition of the amounts entered on the coupons of those family-group cards in which collections were made during that week, and this amount must correspond with the cash turned in by the collector. A clerk of the office will bring the third or branch office set of cards into conformity with the collector's cards turned in each day by severing the corresponding office card coupons and copying the brief entry from the first coupon of each of the collector's cards. It will be obvious that this process is a simple one, requiring no knowledge of accounting and no particular skill, and can be performed speedily and with only elementary knowledge by a low-priced clerk. The clerk, for each card he receives from the agent, selects the corresponding office card bearing the same group number, superposes the two cards, tears the projecting excess coupons off the office card and copies the entry from the first coupon remaining on the collector's card onto the corresponding coupon on the office card. This process takes little time and thus the office is enabled to check the collector's work each day and each week. Obviously, a fourth or home office set of cards could be brought into conformity with the collector's or the branch office cards in the manner just set forth.

It will be seen that the execution of my system involves merely the use of a single printed form, that is, the card shown on the drawings, the said cards being distributed in triplicate, one to the householder who pays premiums for the family-group, one to the agent or collector, and one to the branch office, and if desired, a fourth one to the home office. The high expense of special ledgers and elaborate debit books and of large numbers of clerical assistants required in other systems is thus effectively avoided.

In the actual execution of the system, the chances for errors are reduced to a minimum, if not entirely eliminated. The acts performed by the collector will be clearly understood, even by the most illiterate payer of premiums. Such person will in all cases know for how many weeks payment is being made and will make it a point to see that the agent or collector severs from the cards as many coupons as there are weekly installments paid. The system thus inherently guards against error and fraud on the part of the collector.

As between the policy-holder, the collector and the insurance company, in the matter of the small premium payments with which the invention is concerned, disagreements may from time to time arise regarding the number of installments paid at the last collection and the date of such payment, but disputes as to earlier payments are rarely, if ever, heard of. The amount and date of last payment, substantially the only subject of eventual dispute, as above noted, is always found marked upon the policy-holder's and the collector's card. Each prior entry, however, is automatically discarded as it becomes obsolete. I thus avoid the preservation of a great amount of useless data which would only tend to confuse in the making of entries and the compilation of reports.

In collection systems, in which the agent or collector is required to preserve vouchers of some sort for each weekly collection, he is called upon to carry a bulky collection volume or receipt book, and ordinarily it is unfeasible, without increasing the size of the volume or book to impractical dimensions, to include all of the data as to policy numbers, age, amount, kind of insurance, etc., the inclusion of which is rendered feasible by the use of my system. The latter information is of great value to the collector, who is usually charged with the duty of writing new policies and who in many cases never sees the different members of the family-group. The data which my system renders available enables the agent or collector frequently to determine the opportune time for attempting the sale of additional insurance. For instance, each policy number on the card will indicate to the agent the year in which the policy was written and that, in combination with the age of the insured at the time the policy was issued, also noted on the card, will indicate almost at a glance the present age of each policy-holder, which information is useful in determining when the individual reaches such age as to warrant broaching the subject of increased insurance.

In case the number of policy-holders in any group decreases at any time during the year by death or lapses, or increases by the writing of new policies, it is a simple proceeding to cross off from the cards such eliminated member or to add such new member, whereupon the total amount to be collected will, of course, be correspondingly decreased or increased. If desired, a substitute group card may be issued in each such case, although it is preferred to use the old card.

It will be understood that although the system has its preferred application to collection systems for industrial life insurance policies, it is not limited to said application, but may be used in any installment collection or payment systems. It will also be understood that folders or other units may be substituted for the cards, that the arrangement of the spaces on the cards may be varied, and that room for further data or for less data than shown may be provided as desired, or required. Obviously, the system is not limited in its application to weekly collections, but may be applied in cases where the transactions occur at monthly or other intervals.

Having thus described my invention, what I claim as new and desire to secure by Letters Patent of the United States is:—

1. A device for use in keeping records of industrial life insurance premium collections, comprising a unitary sheet having a succession of identical severable tabs corresponding to the due dates of the successive instalments, each tab with appropriately designated blanks for entry of data thereon for authentic identification of that instalment collection by which the account was paid to the due date identifying the last unsevered tab on which the entry is made, whereby a multiplicity of the accounts may be readily classified according to the state of advance and arrears by superposition according to contours.

2. A device for use in keeping records of industrial life insurance premium collections comprising a unitary card having a succession of identical severable rectangular tabs corresponding to the due dates of the successive instalments, each tab with appropriately designated blanks for entry of data thereon, the last of the tabs remaining on the card having entered thereon the identification of that instalment collection by which the account was paid to the due date identifying said tab, whereby a multiplicity of the accounts may be readily classified according to the state of advance and arrears by superposition according to contours.

3. The method of keeping records of industrial life insurance premium collections by the use of cards, which consists in severing from the end of the card, in making a collection, a strip corresponding in area to the number of unit collections made and indicating at the end remaining on the card beyond the severed strip data identifying the collection last made, and classifying the accounts according to the state of advance and arrears by superposition in piles according to contours.

Signed at New York city, in the county of New York and State of New York, this 14th day of March, A. D. 1921.

HARRY HIRSCH.